Sept. 26, 1939.   G. A. ROSENFELDER   2,174,481
ATTACHMENT FOR BIRD CAGES
Filed June 20, 1938
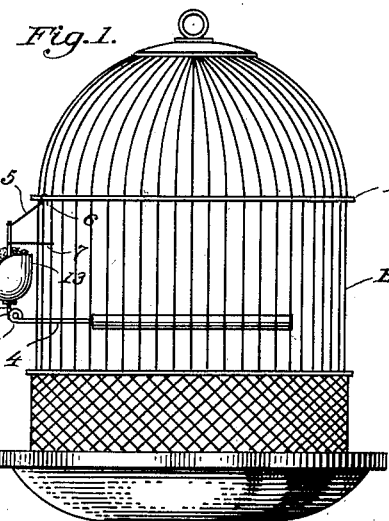
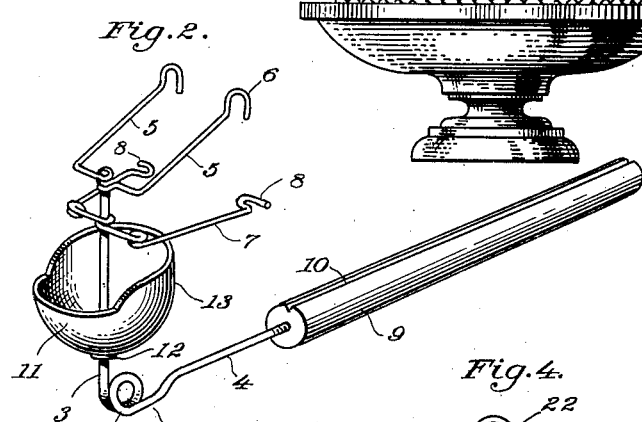
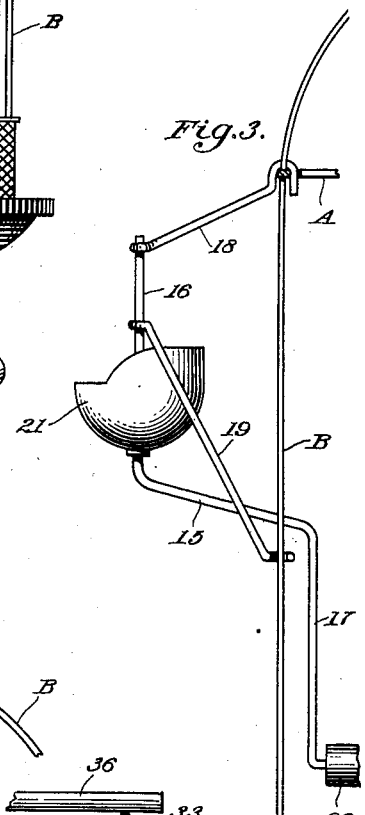
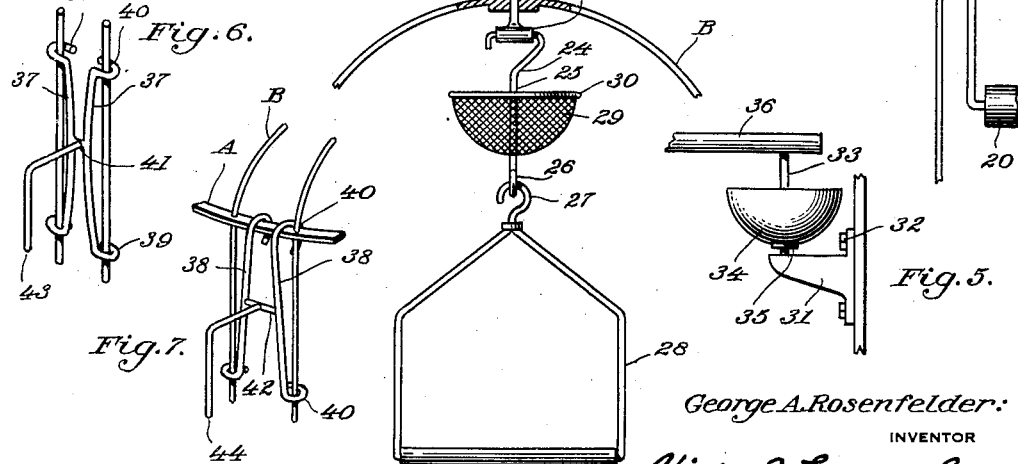
George A. Rosenfelder,
INVENTOR
BY Victor J. Evans & Co.
ATTORNEYS Patented Sept. 26, 1939

2,174,481

UNITED STATES PATENT OFFICE 2,174,481

ATTACHMENT FOR BIRD CAGES

George A. Rosenfelder, Haysville, Pa.

Application June 20, 1938, Serial No. 214,776

1 Claim. (Cl. 119—25)

This invention relates to bird cages, and its general object is to provide a vermin trap and perch attachment therefor, that can be easily and expeditiously applied and removed with respect to the cage, yet casual removal or displacement is practically impossible.

A further object is to provide an attachment of the character set forth that includes a vermin trap in the form of a cup providing a natural nesting place for vermin, such as lice, mites and the like which infest birds, and the cup is mounted on cage attaching means for disposal exteriorly or interiorly of the cage, and the attaching means may be of resilient nature but in any event has a perch secured thereto for disposal within the cage but spaced therefrom.

Another object is to provide a vermin trap and perch attachment for bird cages that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view illustrating one form of my attachment applied to a bird cage.

Figure 2 is a perspective view of the form as shown in Figure 1.

Figure 3 is a side view of a modified form applied to a cage.

Figure 4 is a front view of another modified form applied to a cage.

Figure 5 is a side view of still another modified form.

Figures 6 and 7 are perspective views of modified forms of attaching brackets applied to a cage.

Referring to the drawing in detail, and particularly to the form of Figures 1 and 2 it will be noted that it includes a supporting member 1 preferably made from a strand of substantially heavy rod like wire looped upon itself as at 2, to add to the resiliency of the supporting member and from the looped portion the strand is extended to provide portions disposed at right angles with respect to each other and which I term a vertical portion 3 and a horizontal portion 4.

The vertical portion has secured thereto attaching arms arranged in pairs and the upper arms which are indicated by the reference numeral 5 are provided from a single strand of wire coiled between its ends, with the coiled portion fixed to the vertical portion or upright 3 by solder or other suitable securing means and from the coiled portion the strand extends outwardly in substantially diametrically opposed directions from the vertical portion, thence is bent at right angles upon itself to provide the arms 5 which terminate in vertically arranged hooks 6 for disposal about the bracing ring A of the wire strands of the body B of the cage, as shown in Figure 1. The arms 5 are disposed at an upward inclination with respect to the vertical portion, and the lower arms which are indicated by the reference numeral 7 are likewise formed from a single strand of wire coiled between its ends, with the coiled portion fixed to the vertical portion 3 and extending from the coiled portion are substantially diametrically opposed portions from which extend the arms 7 for disposal at right angles thereto, and the strand that provides the arms 7 is coiled at the juncture of the arms 7 with the substantially diametrically opposed portions to add to the resiliency of the arms, as will be apparent. The arms 7 terminate at their outer ends in horizontally arranged hooks 8 for disposal about two of the body strands of the cage, for cooperation with the hooks 6 to secure the attachment to the cage, as clearly shown in Figure 1.

The horizontal portion may be bent as shown, and is preferably provided with a threaded outer end having mounted thereon a perch member 9 which may have a groove 10 extending longitudinally thereof throughout its length, as shown in Figure 2. The horizontal portion extends through the wire strands of the cage in spaced relation with respect thereto for disposing the perch member 9 within the cage, and the perch member is of a length so that the outer end thereof terminates a considerable distance from the opposite side of the cage, as shown in Figure 1.

Mounted on the vertical portion or upright 3, is a vermin cup 11, and it will be noted that the vertical portion 3 extends through the center of the bottom of the cup which is secured to the vertical portion 3 in a leak proof manner, and the vertical portion preferably has a collar 12 mounted thereon to act as a supporting means for the cup, as will be apparent.

The cup is preferably shaped to provide a shield portion 13 and may be used for receiving insecticide for killing vermin, but as the cup is primarily designed to provide a natural nesting place for vermin, such as lice and mites which leave the birds at certain intervals for breeding, I insert a mass of raw cotton or the like 14 within the cup to provide a nest for the vermin.

From the foregoing, it will be seen that when the vermin are received in the cup, they are either destroyed by the insecticide or the attachment in its entirety can be removed from the cage to be deposited in boiling water or insecticide for killing the vermin.

The form of Figure 3 is substantially similar to that of the form of Figures 1 and 2, in that it includes a supporting member that is likewise formed from a strand of rod like wire, to provide an inclined intermediate portion 15, and upper and lower vertical portions 16 and 17 respectively. The upper vertical portion has secured thereto attaching members including pairs of arms 18 and 19 and the attaching members may be similar to those of the form of Figures 1 and 2, but in any event the arms terminate in hooks similar to the hooks 6 and 8 to be received by the cage, as shown. In this form, the arms 18 and 19 both are inclined with respect to the upper vertical portion 16, the arms 18 being inclined upwardly, and the arms 19 downwardly. From the lower vertical portion the strand extends at right angles with respect thereto, for disposal horizontally and has a perch member 20 fixed on the horizontal portion. The upper vertical portion 16 has fixed thereon a vermin cup 21 identical with the cup 11.

In Figure 4, I have illustrated an attachment of the swinging type that includes a ring member 22 provided with a shank extending through the upper portion of the cage and secured to the inner end of the shank is a sleeve 23 which has mounted therein for swinging movement the hooked upper end 24 of a suspended supporting member 25 that terminates at its lower end in an eye 26.

Mounted in the eye 26 is the hooked upper end 27 of a frame type perch 28, and secured to the supporting member 25 by solder or other like securing means is a cup 29 which is formed from reticulated material and has a reinforcing rim 30 about the upper edge thereof. The cup 29 is of substantially semi-spherical formation and is of course adapted to receive raw cotton or the like to provide a nest for the vermin. However, the raw cotton may be saturated with insecticide, as will be apparent.

The form of Figure 5 is primarily designed for attachment to a cage that includes a metallic wall as shown, in that this form is provided with a bracket 31 to be secured to the wall by screw bolts 32 that extends through ears of the bracket, which has secured to and rising from the upper surface thereof an upright 33 having secured thereto a cup 34, with the upright 33 extending through the center of the cup. It will be obvious that a leak proof connection is provided between the cup and the upright, and the cup is shown as being supported upon a collar 35. Secured to and extending horizontally from the upper end of the upright is a perch member 36.

The attaching brackets of the forms of Figures 6 and 7 each include a pair of arms 37 and 38 respectively which have their ends bent in hook formation, as at 39 and 40 for attachment to the cage, and bridging the arms of the brackets are cross members 41 and 42 respectively. Each of the cross members have formed thereon a supporting member indicated respectively by the reference numerals 43 and 44 and the supporting members are bent in right angle formation, as shown, to provide horizontal portions and vertical portions, the latter portions having cups, not shown, mounted thereon, and the supporting members likewise include lower horizontal portions for disposal within the cage and have perch members secured thereto in the same manner, as in the forms of Figures 1, 2 and 3.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

An attachment for a bird cage, comprising supporting means formed from a single strand of rod like wire to provide a vertical portion and a horizontal portion, a vermin receiving cup secured to said vertical portion with the latter extending centrally therethrough, superimposed pairs of spring arms secured to said vertical portion above the cup, hooks on the outer ends of each pair of arms, the hooks of the upper pair being disposed vertically and the hooks of the lower pair disposed horizontally, said hooks adapted for detachably securing the supporting means to the cage for disposing the cup exteriorly thereof, and a perch secured to the horizontal portion and arranged within the cage but spaced therefrom.

GEORGE A. ROSENFELDER.